No. 771,902. PATENTED OCT. 11, 1904.
J. J. FRANK.
MACHINE FOR WINDING COILS.
APPLICATION FILED JAN. 21, 1901.
NO MODEL. 2 SHEETS—SHEET 1.

Witnesses.
John Ellis Glenn.
Benjamin B. Hull.

Inventor.
John J. Frank,
by Albert S. Davis
Atty.

No. 771,902. PATENTED OCT. 11, 1904.
J. J. FRANK.
MACHINE FOR WINDING COILS.
APPLICATION FILED JAN. 21, 1901.
NO MODEL. 2 SHEETS—SHEET 2.

Witnesses.
John Ellis Glenn.
Benjamin B. Hull.

Inventor.
John J. Frank,
by Albert B. Davis
Atty.

No. 771,902.                                              Patented October 11, 1904.

UNITED STATES PATENT OFFICE.

JOHN J. FRANK, OF SCHENECTADY, NEW YORK, ASSIGNOR TO GENERAL ELECTRIC COMPANY, A CORPORATION OF NEW YORK.

MACHINE FOR WINDING COILS.

SPECIFICATION forming part of Letters Patent No. 771,902, dated October 11, 1904.

Application filed January 21, 1901. Serial No. 44,041. (No model.)

*To all whom it may concern:*

Be it known that I, JOHN J. FRANK, a citizen of the United States, residing at Schenectady, county of Schenectady, State of New York, have invented certain new and useful Improvements in Machines for Winding Coils, of which the following is a specification.

My invention relates to machines for winding coils of wire to be used for electrical apparatus, and especially for transformers. Its object is to enable coils of the same or different sizes to be wound quickly, to keep the coils closely compressed during the winding, to clamp them firmly, and to facilitate their removal from the machine for cementing or other subsequent treatment.

Although my machine is especially adapted to the edgewise coiling of flat or ribbon-shaped wire or conductor which has or has not been previously insulated, it can also be advantageously used to wind coils of one or more sections each of one or more layers, the cross-section of the conductor not being limited to a particular shape, size, or form.

I accomplish these desired results by a machine such as is hereinafter described in detail, which is intended for coils requiring a cylindrical winding form. My machine, however, is not limited to this particular shape, but can also be either polygonal, frusto-conical, or frusto-pyramidal in shape.

The machine comprises a segmental or sectional mandrel, supports and covering for the segments or sections, means for expanding and contracting them, removable gages to limit or fix the size to which the mandrel may be expanded, and collars which can afterward be used to clamp the coils to facilitate their removal from the mandrel for the purpose of cementing or for any other reason whatsoever.

Figure 1:
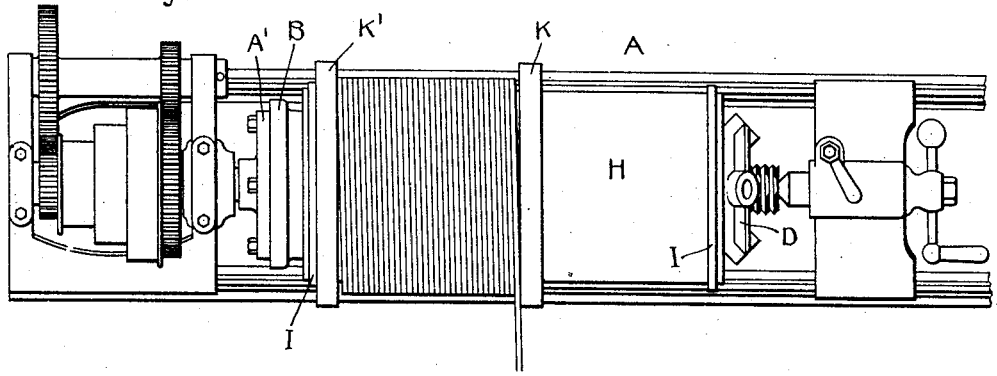
Figure 2:
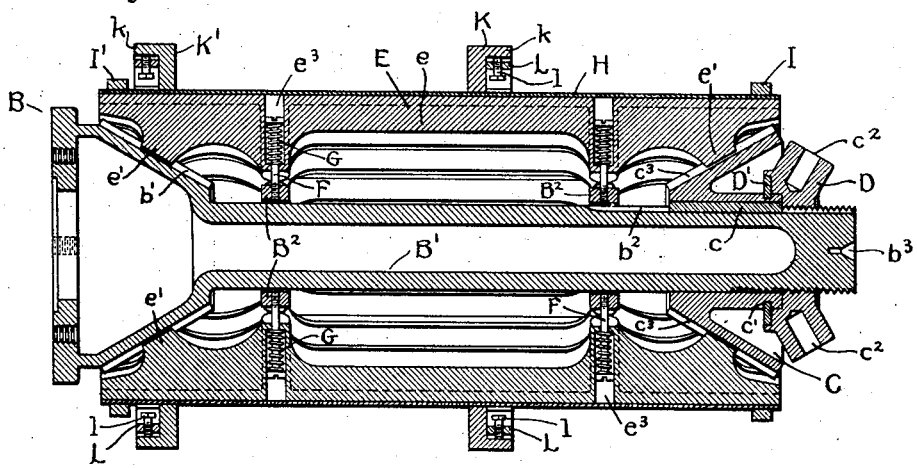
Figure 7:
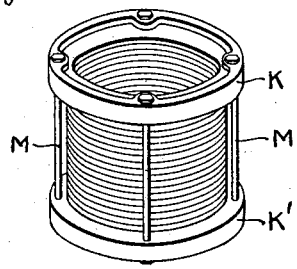
Figure 3:
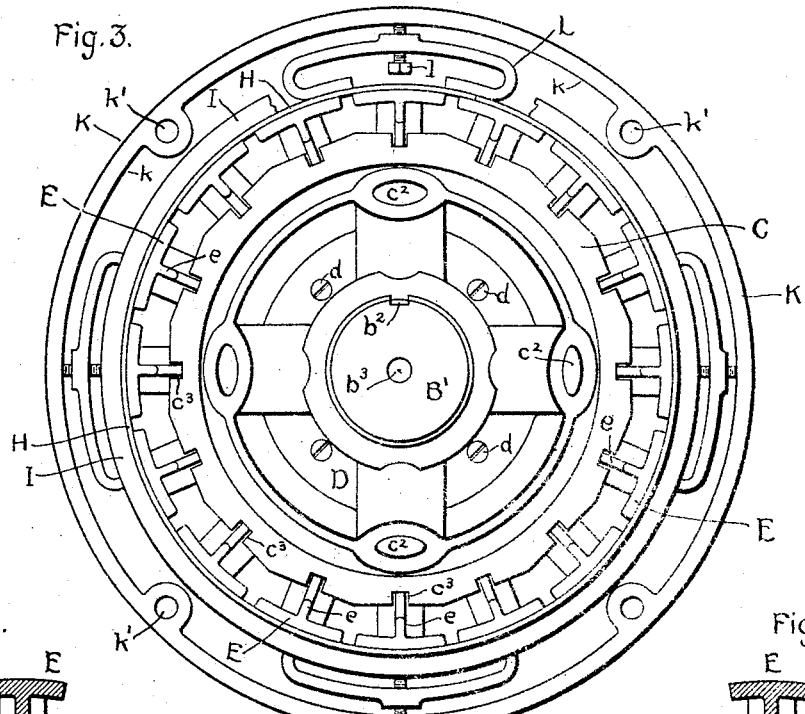
Figure 5:
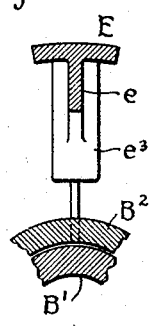
Figure 6:
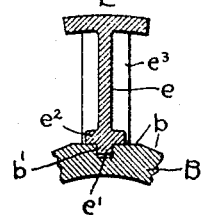
Figure 4:
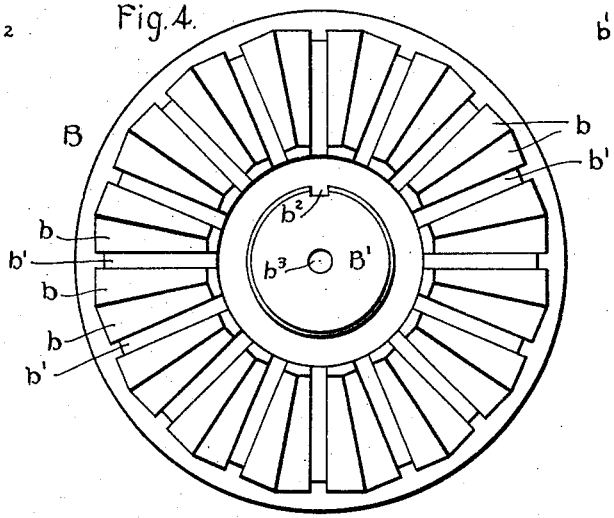

In the drawings, Figure 1 is a top plan view of my machine. Fig. 2 is a longitudinal section of the mandrel, showing the collars, gages, the segments of the mandrel, their covering and supports, and the expanding and contracting devices. Fig. 3 is an end view. Fig. 4 is an end view, on a larger scale, of the shaft and its frusto-pyramidal head. Figs. 5 and 6 are detail cross-sections of a mandrel-segment. Fig. 7 shows a wound coil clamped between collars and removed from the mandrel.

The mandrel can be mounted on a special driving mechanism, if desired; but for better illustration I have shown it in an ordinary back-geared lathe A, having a face-plate A', to which the head or fixed support B of the mandrel is bolted. Concentric with the head or support B and preferably integral with it is a shaft B', the further end of which is screw-threaded and provided with a keyway $b^2$ and hole $b^3$. To decrease the weight of this shaft and head, they may be made hollow, as shown in the drawings. This head B forms a rigid support for the mandrel-segments and has a frusto-pyramidal shape, each side of which is provided with a groove $b'$. A movable head C is mounted to slide on the shaft B', having a spline $c$ engaging with the keyway $b^2$, so as to rotate with the shaft. This head C forms a movable support for the mandrel-segments and has a frusto-pyramidal shape similar to the fixed support B, each side of which is provided with a groove $c^3$. A nut D is tapped to mesh with the screw-threads on the shaft and is rotatably connected with the movable support C, as by means of a ring D', made in segments fastened to the nut D, as by screws $d$, the ring D' entering an annular groove $c'$ in the hub of the movable support C, as more clearly shown in Fig. 2. The nut D is provided with means for turning it, such as radial sockets $c^2$, to receive a lever-handle.

The mandrel proper is made up of cylindrical segments E, each having a radial rib $e$, the end portions of which at $e'$ enter the grooves $b'$ and $c^3$ with a sliding fit. The rib $e$ has lateral flanges $e^2$, bearing on the sides of the supports adjacent to the grooves. At one or more points along each segment are sockets $e^3$, which receive radial screws F, fixed in collars $B^2$, surrounding the shaft B' with a loose fit. Between the heads of the screws F and inner ends of the sockets are springs G, which tend to contract the mandrel by drawing the segments toward the shaft. The mandrel is provided with a covering H, such as vulcanized fiber, preferably in the form of a sheet wrapped around the mandrel with or without overlapping edges.

Surrounding the mandrel near each end are gages I and I' of predetermined size, such as the solid rings shown on the drawings. Between the gages I and I' are placed collars K and K', provided with a flange $k$, between which and the covering of the mandrel are placed several removable springs L. Each spring is provided with a set-screw $l$, which bears against the flange $k$. These set-screws hold the springs in place and afford means for adjusting the pressure of the springs. The collars K and K' also have several holes $k'$, through which bolts M can be passed to clamp the coils together, as shown in Fig. 7.

The operation of my device is as follows: After the proper gages and collars have been selected they are slipped over the mandrel and the dead-center of the lathe run up into the center hole $b^3$. The nut D is then turned so that the movable support C slides along the shaft B' toward the fixed support or head B and forces the segments E to expand until they are checked by the gages I and I'. One end of the wire, which is flat and placed to be wound edgewise, is then secured, as to one of the collars, K', whose springs L are set so as to clamp it tightly on the mandrel. The other collar, K, is then brought up close against the wire, the springs in said collar being so adjusted as to give it a yielding engagement with the mandrel. The machine is then started, and as the mandrel revolves the wire is wound on a helical coil, the yielding collar K being crowded away from the fixed collar K' as each successive turn is wound in place. The resistance to movement of the yielding collar K prevents the coil from spreading and acts as a guide for the wire as each turn is successively wound in place. The tension necessary to bring the wire down against the mandrel or its cover is regulated partly by the pressure of the yielding collar K and partly by the operator, who may have any suitable auxiliary tension device, as is customary in the winding of coils. When the required number of turns have been wound, the collars K and K' are turned to bring the holes $k'$ in line, so that bolts may be passed through them and the collars clamped tightly against the winding. The nut D is then turned so that the movable support C slides away from the fixed support B, allowing the expansion of the springs G to contract the mandrel, so that the coil may be readily removed from the machine after the gage-ring I and the dead-center of the lathe have been withdrawn. After the coil has been taken to the cementing or insulating bath and dried the collars may be removed and again used in winding other coils.

With this machine an operator is thus able quickly to wind coils of a great number of turns of a single conductor or two or more in multiple without taking any measurements or using any other special precaution.

What I claim as new, and desire to secure by Letters Patent of the United States, is—

1. A mandrel for winding coils of wire, made up of sections, supports for said sections, and a flexible covering surrounding said sections.

2. In an expanding mandrel, the combination with a plurality of movable sections, of a shaft carrying a pyramidal support fixed on said shaft, each side of said support being provided with a groove to engage with a sliding fit a section of the mandrel.

3. In an expanding mandrel, the combination with a shaft carrying a pyramidal support fixed thereon, of a movable pyramidal support splined to said shaft so as to rotate with it, each side of said supports being provided with a groove, and a plurality of movable sections each having a sliding fit in one of said grooves.

4. In an expanding mandrel, the combination with a shaft carrying a pyramidal support fixed thereon, of a movable pyramidal support splined to said shaft so as to rotate with it, each side of said supports being provided with a groove, and a plurality of movable sections each having a sliding fit in one of said grooves and provided with lateral flanges that bear upon the sides of the supports adjacent to said groove.

5. In an expanding mandrel, the combination with a shaft carrying at one end a fixed pyramidal support and having screw-threads at the other end, of a movable pyramidal support splined on the shaft so as to rotate with it, a nut meshing with the screw-threads in the shaft and engaging with the movable pyramidal support, and expansible segments carried on said supports.

6. In an expanding mandrel, the combination with a plurality of movable sections provided with sockets, of springs in said sockets tending to contract said mandrel.

7. The combination with an expanding mandrel, of a collar engaging said mandrel with a yielding pressure, so as to be capable of sliding along the mandrel under pressure.

8. The combination with an expanding mandrel, of collars having springs bearing on said mandrel.

9. The combination with an expanding mandrel, of collars having removable springs bearing on said mandrel.

10. The combination with an expanding mandrel, of flanged collars having springs between the flanges and the mandrel.

11. The combination with an expanding mandrel, of flanged collars having removable springs located between the flanges and the mandrel.

12. The combination with an expanding mandrel, of flanged collars having removable springs, means for holding said springs in position, and means for varying the pressure or strength of said springs.

13. The combination with coil-forming apparatus, of a follower-collar provided with adjustable tension means consisting of springs and devices for moving them radially.

In witness whereof I have hereunto set my hand this 18th day of January, 1901.

JOHN J. FRANK.

Witnesses:
   BENJAMIN B. HULL,
   MARGARET E. WOOLLEY.